3,558,514
REDUCTIVE GAS REGENERATION OF METAL IMPREGNATED COKED CATALYST

Hans U. Schutt, Berkeley, Calif., assignor to Shell Oil Company, New York, N.Y., a corporation of Delaware
No Drawing. Filed Apr. 29, 1968, Ser. No. 725,194
Int. Cl. B01j *11/02*
U.S. Cl. 252—411      5 Claims

ABSTRACT OF THE DISCLOSURE

A process for non-oxidative regeneration of coked hydroconversion catalysts characterized by incorporating on a coked catalyst a hydrogenation metal compound (preferably in situ) followed by contact with hydrogen and preferably hydrogen plus hydrogen sulfide at elevated temperatures.

BACKGROUND OF THE INVENTION

Field of the invention

This invention relates to a novel non-oxidative regeneration technique for removal of carbonaceous deposits and nitrogen poisons from hydroconversion catalysts. More particularly it relates to an effective non-oxidative method for removing coke and nitrogen poisons from supported hydrogenative metal catalysts by depositing on the coked catalyst a hydrogenative metal compound followed by contact with a reductive gas, such as hydrogen, or hydrogen and hydrogen sulfide. The process of the invention, which is preferably conducted in situ in the hydroconversion zone, obviates many difficulties of oxidative regeneration techniques.

Catalyst composites containing hydrogenative metal compound components supported on refractory oxide supports are widely used in the petroleum refining industry. For many applications the support is either acid-acting or has induced acidic properties, as by incorporation of a halogen component. For example, naturally occurring or synthetic acidic composites, such as activated clays and alumina, synthetic silica-aluminas, silica-magnesias, and the like, are widely used as catalyst support for nickel, which has hydrogenating-dehydrogenating activity, for use in the hydrofining and hydrocracking of petroleum distillates. In such reactions, the catalysts lose some or all of their activity after a period of continued use, the rate of deactivation depending to a large extent upon the conversion conditions and the character of feedstock employed. This loss in catalytic activity is generally attributed to several factors that occur within the reaction zone. One of the deactivation effects is due to the formation of carbonaceous deposits on the catalyst. The deactivating effect of coke is due largely to physical masking of the catalytic sites within and on the catalyst. Removal of coke from a coke-deactivated catalyst can generally be accomplished by burning the coke in the presence of an oxygen-containing gas at elevated temperatures.

Another type of deactivation results from the deposit and buildup of nitrogen-containing compounds on the catalyst. Petroleum fractions used as feedstock in hydrofining and hydrocracking and the like contain varying concentrations of organic nitrogen-containing compounds. Nitrogen compounds, generally basic in nature, titrate the acidic sites of the catalyst, thereby neutralizing the catalytic acidity necessary for the desired conversion reaction. Nitrogen compounds, like coke, can be removed from the catalyst by oxidation regeneration.

However, as is well known, oxidative regeneration is as a rule detrimental to the overall life of a catalyst to the extent that after several regenerations the catalyst must be discarded. The formation of water during oxidative coke-removal subjects the catalyst to steam at high temperature which is known to be a deactivating influence. Moreover, in addition to the possible permanent damage to the catalyst per se various other difficulties are encountered in commercial application of oxidative regenerations. Before oxygen can be introduced for regeneration, hydrogen must be exhaustively removed from the reactor system. In addition, oxygen must be carefully injected to prevent uncontrolled burning which would result in extremely high spot temperatures causing damage to the catalyst and reactor. This problem is particularly serious in large commercial reactors where flow maldistribution is likely.. Thus, considerable time is required to effect a complete oxidative regeneration and in reaction systems where catalyst deactivation is severe—because of operating conditions and/or coking feedstock—there is great incentive for a non-oxidative means for removing deleterious catalyst deposits and restoring catalyst activity.

The present invention is directed to a non-oxidative regeneration process which effectively removes both coke and nitrogen poisons from spent catalyst.

SUMMARY OF THE INVENTION

In broad aspect the present invention is a process for regenerating coked hydroconversion catalysts characterized by incorporating on a spent, coked catalyst a minor amount of a hydrogenation metal compound and contacting the catalyst with a reductive gas mixture at a temperature above about 600° F.

By hydroconversion catalysts is meant catalysts comprising a hydrogenative metal component disposed on a solid refractory oxide support such as catalysts used for various hydrogenation-conversion reactions including hydrocracking, isomerization and hydrotreating (denitrification, desulfurization and dearomatization, etc.) and the like.

The present invention is to be distinguished over present methods of manufacturing catalyst by incorporating metals into catalyst supports and methods of presulfiding such catalyst before use. In preparing the original catalysts, metals incorporated into the support are generally converted to the oxide or sulfide form before use. In the present invention, spent catalyst having deleterious deposits of coke and in many cases other catalytic poisons from use in the conversion process are regenerated by incorporating a metal compound on the coked catalyst followed by contact with a reductive gas. The incorporated metal is deposited on the coke which in turn is on the catalyst particles.

In one embodiment of the invention the reductive gas comprises hydrogen and hydrogen sulfide. Such a reductive treatment is particularly applicable to catalysts which contain as the hydrogenation component a metal sulfide in which case the additional advantage of eliminating the need for resulfiding the regenerated catalyst is obtained. Especially suitable are catalysts containing metals of Group VIII and Group VI or mixtures thereof, supported on refractory oxide solid supports, such as alumina, silica, magnesia, zirconia, thoria, etc. and mixtures thereof. Sulfided nickel and tungsten on a silica-alumina support is a specific example of a hydrofining or hydrocracking catalyst for which the process of the invention is especially appropriate.

Hydogen sulfide in the reductive gas helps maintain the metal in the sulfide state and reduces the tendency of the metal component to agglomerate or sinter—a process which reduces available catalytic metal surface to the detriment of catalytic effectiveness. It is to be noted that used catalysts have, in many instances, already been exposed to sulfur (from presulfiding or from organic sulfides in the hydrocarbon feed) prior to the regeneration treatment of the invention.

Any suitable hydrogenation metal compound may be used to effect hydrogenative coke removal. Metals from Group IV, Group VI and Group VIII of the Periodic Table of Elements are particularly appropriate.

The metal can be deposited on the spent catalyst by any means known to the art for depositing metals or metal compounds on solids. However, it is of particular advantage to treat the catalyst in the reactor where the conversion reactions take place. It is also desirable, but not essential, that the metal be incorporated from a non-aqueous medium since the presence of water has unfavorable effects on catalyst properties. For example, metal can be deposited on the spent catalyst by flooding a catalyst bed with a non-aqueous solvent containing the desired hydrogenative metal salt. Alternatively, metal can be deposited by including an appropriate metal salt or metal porphyrin in a hydrocarbon feedstock immediately prior to regeneration under conditions such that the metal is deposited throughout the catalyst bed. The catalyst can also be impregnated with metal from a gas using a metal compound which is volatile at the desired impregnation temperature, as for example, tin tetrachloride which vaporizes at about 215° F. or molybdenum carbonyl which decomposes thermally at relatviely low temperature to yield molybdenum metal. Metal carbonyl can be combined with other gases, as for example, oxygen or sulfide, and deposited as the metal compound, i.e. the oxide or sulfide. Of course, the catalyst may be removed from the reactor, impregnated and regenerated.

In general, only a minor amount of deposited metal in the range of about 0.01% to about 5% by weight basis spent catalyst is sufficient to enhance coke removal. It is not desirable to use metal in excess of that required to accomplish the desired result since excessive metal may tend to influence the catalyst behavior in subsequent operating cycles. Usually about 0.01%–1% w. metal, basis spent catalyst is suitable.

Contact of the catalyst with the reductive gas mixture should be at an elevated temperature, i.e., about 600° F., and preferably 800° F. or higher. High temperatures apparently are more beneficial and tend to reduce the time and amount of gas necessary to effect the regeneration. Temperatures higher than about 1,200° F. should normally be avoided to minimize possible damage to the catalyst. Preferably the treatment should be effected below 1,100° F.

The regeneration gas treatment can be effected at substantially atmospheric to considerably elevated pressures. Generally the treatment will be effected at pressures normally used in the conversion reaction, e.g., about 500–2500 p.s.i.g. The use of high pressures such as those employed in the conversion reaction, results in relatively high mass flow rates which decreases the time required for the regeneration treatment and, of course, avoids the necessity of changing pressure for regeneration. In general, for good results, the treatment is carried out until at least 1000 standard cubic feet of gas is used per cubic foot of catalyst. While higher volumes of gas, e.g. up to about 100,000 s.c.f./cubic foot of catalyst and higher can be used, it is preferred to use about 5,000 to 100,000 standard cubic feet per cubic foot of catalyst.

As already mentioned, it is often desirable to include hydrogen sulfide in the reductive gas, especially where the catalytic metal is in the sulfidic form. The amount of hydrogen sulfide in the reductive gas mixture should be at least about 1% w. and preferably about 10% w. Concentrations of hydrogen sulfide as high as 50% v. or more may be used but generally a concentration of 5–20% is suitable.

DESCRIPTION OF PREFERRED EMBODIMENTS

The regeneration process of the present invention is especially suitable for regeneration of spent hydrocracking catalysts which are subject to nitrogen poisons since the treatment not only removes coke deposits but removes deposited nitrogen compound poisons as well. Illustrative of the application of the present process is its use for restoring activity to nickel-containing hydrocracking catalysts which have become deactivated by accumulated coke and nitrogen deposits. Such catalysts contain nickel incorporated into a siliceous component such as, for example, silica-alumina and may be additionally promoted with a halogen compound and one or more transitional metals, such as cobalt, molybdenum, tungsten, silver, etc. and activated by sulfiding prior to use.

The catalyst gradually becomes deactivated during use. The temperature is customarily raised to maintain constant conversion to cracked products, for example, gasoline. When a predetermined temperature limit is reached as dictated by mechanical limitations, catalyst properties and conversion selectivity degradation, the catalyst must be regenerated.

In one embodiment of the present invention, the regeneration is effected by reducing the feed rate and temperature and adding to the feed metal porphyrins until the entire catalyst bed is in contact with the metal containing feed whereupon the temperature is raised to crack the porphyrins leaving the metal deposited on the catalyst. Alternatively the feed is discontinued; the reactor cooled and flooded—as by back-flushing with a solution of a metal salt (such as nickel or molybdenum acetylacetonates in dimethyl-disulfide). In another embodiment the feed is discontinued and the catalyst bed contacted with a gas containing a vaporized compound such as tin tetrachloride.

After metal incorporation, the catalyst is contacted with a mixture of hydrogen and hydrogen sulfide at a temperature of at least 600° F. and below about 1,100° F. For example, hydrogen sulfide can be added to an existing process hydrogen circulation system. This treatment is continued until at least about 1,000 standard cubic feet of gas is used per cubic foot of catalyst.

The use of hydrogen sulfide in the regeneration gas makes resulfiding of the catalyst unnessary and the hydrocracking operation may be immediately resumed upon completion of the reductive regeneration.

The obvious advantages of the present reductive regeneration procedure over oxidative regenerations will be immediately obvious to those skilled in the art as will the various means of employing the present process to maximum advantage in a particular circumstance.

The following examples will further illustrate the practice and advantages of the present invention, but are not to be taken as a limitation thereof.

Example I

A series of experiments were carried out to illustrate the effectiveness of the regeneration procedure of the invention.

The catalyst used was a nickel/tungsten/fluoride on silica-alumina which contained 4.7% w. Ni, 3.2% w. W, 3.2% w. fluorine, prepared by incorporating the metal and fluoride into a hydrogel of silica-alumina. The catalyst, after sulfiding, was used for hydrocracking gas oils, in which operation it became deactivated by accumulation of more than 5% w. carbon (as coke) and 0.13% w. nitrogen.

Portions of the catalyst were subjected to reductive regeneration by contact with hydrogen containing 10% v. hydrogen sulfide at 950 volumes of gas/volume of catalyst/hour, 1,800 p.s.i.g. for a period of 48 hours at temperatures of 707° F. and 932° F. The results are shown in Table I.

Other portions of the catalyst were impregnated with various amounts of nickel, molybdenum and tin compounds followed by contact with hydrogen and hydrogen sulfide mixtures at various conditions. The results of these experiments are given in Table I together with the conditions employed. Nickel and molybdenum were impregnated with solutions of the metal acetylacetonate in dimethyl disulfide and tin was impregnated from a solution of tin tetrachloride in dimethyl disulfide.

The results of these experiments clearly demonstrate the advantages of the invention.

Example II

The advantage of incorporating a hydrogenation metal compound on the spent catalyst prior to treatment with the reductive gas is illustrated in the following experiment.

Two samples of the spent catalyst of Example I (containing about 5% w. coke) were regenerated. The first sample was impregnated with about 1.3% w. molybdenum from a solution of molybdenum acetylacetonate in dimethyldisulfide and then contacted with a gas mixture of hydrogen containing 10% v. hydrogen sulfide at 1,800 p.s.i.g. and 932° F. for 40 hours. The gas flow rate was about 950 cc./cc. catalyst/hour. The second sample was not impregnated with metal but otherwise treated in an identical manner.

These regenerated catalysts were tested for hydrocracking a catalytically cracked gas oil at 1,500 p.s.i.g. hydrogen pressure and 0.67 LHSV (volume feed/volume of catalyst/hour). The temperature required to obtain about 67% conversion of gas oil to gasoline after about 80 hours of operation was 558° F. for the impregnated catalyst and 592° F. for the unimpregnated catalyst. These results also demonstrate the effectiveness of the regeneration method of the invention.

Example III

In another experiment, a portion of the spent catalyst of Example I was impregnated with about 0.1% w. molybdenum (from molybdenum acetylacetonate in dimethyl-disulfide) and contacted with 7.5% v. $H_2S$ in $H_2$ at 932° F. for 50 hours. The regenerated catalyst was tested for continuous recycle hydrocracking of a mixed catalytically cracked gas oil feed at 1800 p.s.i., 0.67 LHSV (volume of liquid feed/volume catalyst/hour). After about 50 days of operation the temperature required to obtain 67% conversion to gasoline was 624° F. This compares with a temperature requirement of about 600° F. for fresh catalyst presulfided at 932° F. and tested under the same conditions. Thus, the reductive regeneration substantially restores catalyst activity even at a very low level of impregnated metal.

TABLE I

| Impregnate | Regeneration conditions Temperature, ° F. | Pressure, p.s.i.g. | $H_2S$ concentration in $H_2$ regeneration gas, percent v. | Carbon on catalyst, percent wt. | Nitrogen on catalyst, percent wt. |
|---|---|---|---|---|---|
| Spent catalyst before regeneration | | | | 5.0 | 0.13 |
| None | 707 | 1,800 | [1] 10 | 2.9 | 0.09 |
| Do | 932 | 1,800 | [1] 10 | 2.3 | 0.01 |
| 0.5% wt. Ni | 707 | 1,800 | 10 | 2.1 | 0.09 |
| 0.5% wt. Ni | 932 | 1,800 | 10 | 0.8 | 0.01 |
| 1.3% wt. Mo | 932 | 1,800 | [1] 10 | [2] 0.7 | 0.01 |
| 0.7% wt. Mo | 707 | 1,800 | 10 | 1.8 | 0.06 |
| 0.7% wt. Mo | 932 | 1,800 | 10 | 0.6 | 0.01 |
| 0.05% wt. Mo | 932 | 1,800 | 7.5 | 0.3 | 0.02 |
| 0.01% wt. Mo | 932 | 1,800 | 7.5 | 0.4 | 0.02 |
| 0.05% wt. Mo | 932 | 900 | 7.5 | 1.4 | 0.02 |
| 0.05% wt. Sn | 932 | 1,800 | 7.5 | 0.6 | 0.002 |
| 0.01% wt. Sn | 932 | 1,800 | 7.5 | 1.2 | 0.002 |
| 0.05% wt. Sn | 932 | 900 | 7.5 | 1.5 | 0.005 |
| 0.01% wt. Sn | 932 | 900 | 7.5 | 1.6 | 0.002 |

[1] Regeneration gas flow was 950 volume of gas/volume of catalyst/hour for 40 hours. All other experiments carried out at 1,400 volume of gas/volume of catalyst/hour for 50 hours.
[2] Carbon level measured after 80 hours of resumed hydrocracking test.

I claim as my invention:
1. In a non-oxidative process for regenerating hydroconversion catalysts selected from the group consisting of Group VI and Group VIII metals and compounds and mixtures thereof on a refractory oxide support which have become deactivated by accumulation of deposited coke, the improvement comprising (1) impregnating the deactivated catalyst with a hydrogenative metal compound derived from Group IV, Group VI and Group VIII metals or mixtures thereof in a non-aqueous medium, (2) contacting the catalyst with a reductive gas consisting essentially of hydrogen containing 1% to 50% by volume of hydrogen sulfide at a temperature of about 600 to below about 1,100° F.

2. The process of claim 1 wherein at least about 1,000 standard cubic feet of reductive gas is used per cubic foot of catalyst.

3. The process of claim 1 wherein the hydrogenation conversion catalyst comprises a sulfided metal component supported on a solid refractory oxide support.

4. The process of claim 2 wherein from about 0.01% by weight to about 5% by weight metal, basis catalyst, is impregnated on the deactivated catalyst.

5. The process of claim 3 wherein the hydroconversion catalyst comprises nickel supported on a siliceous refractory oxide, the hydrogenative metal being selected from the group consisting of compounds of tin, molybdenum and nickel and mixtures thereof and is impregnated on the deactivated catalyst in an amount from about 0.01% by weight to about 5% by weight.

References Cited

UNITED STATES PATENTS

| 2,317,494 | 4/1943 | Thomas | 252—411X |
| 3,048,536 | 8/1962 | Coonradt et al. | 252—411X |
| 3,113,097 | 12/1963 | White et al. | 252—411X |
| 3,236,782 | 2/1966 | Koch | 252—411 |
| 3,240,698 | 3/1966 | Leak et al. | 208—110X |
| 3,259,588 | 7/1966 | Harvey et al. | 252—411 |
| 3,459,675 | 8/1969 | Crecelius et al. | 252—411 |

DANIEL E. WYMAN, Primary Examiner

PAUL E. KONOPKA, Assistant Examiner

U.S. Cl. X.R.

208—110, 111; 252—412, 414, 439, 447